July 14, 1931.          M. P. HUBBELL          1,814,699
LATHE CHUCK
Filed May 8, 1928          3 Sheets-Sheet 1
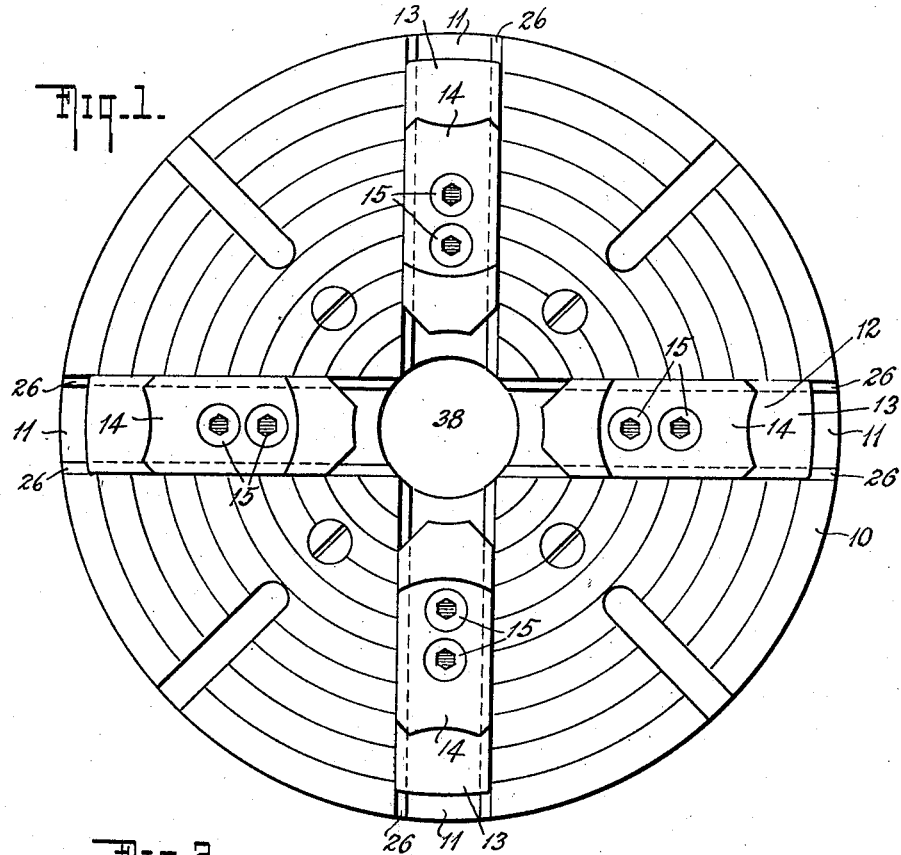
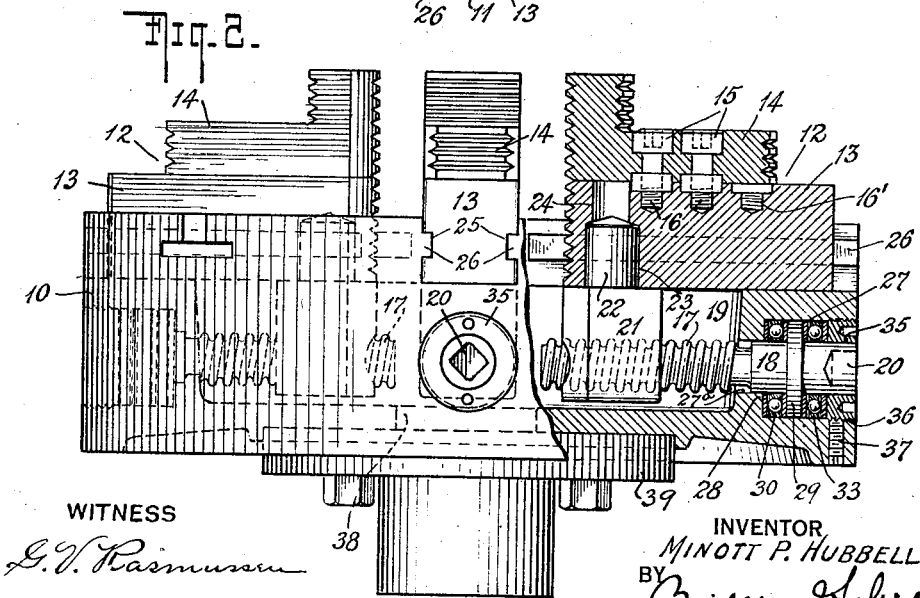
WITNESS
INVENTOR
MINOTT P. HUBBELL
BY
ATTORNEYS July 14, 1931.  M. P. HUBBELL  1,814,699
LATHE CHUCK
Filed May 8, 1928  3 Sheets-Sheet 2
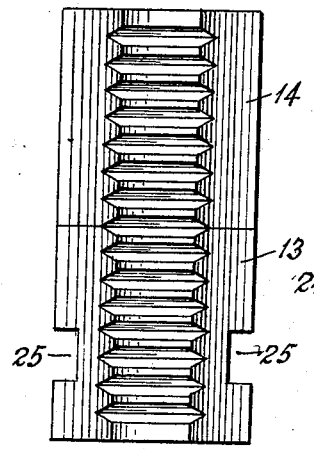
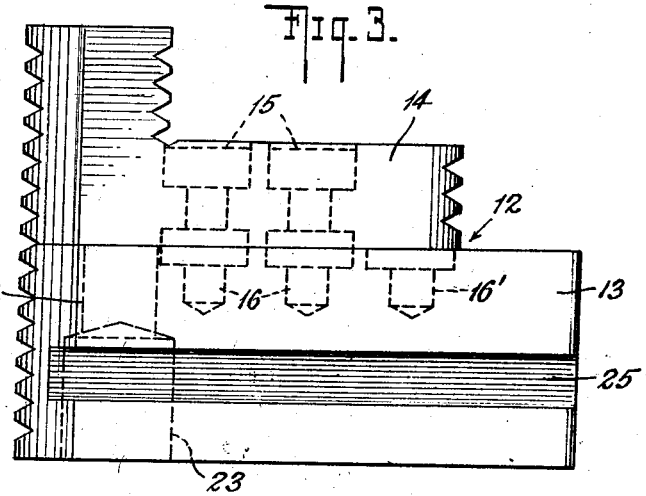
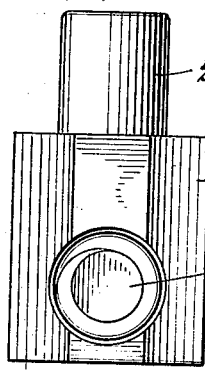
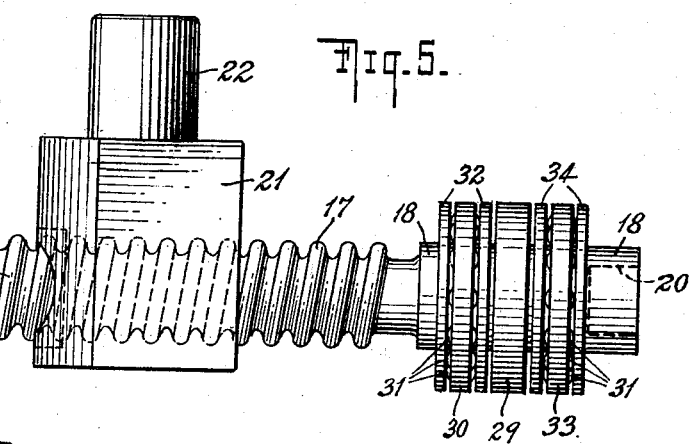
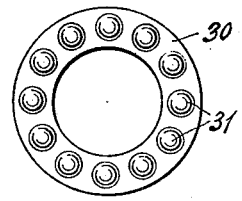
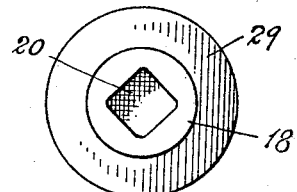
WITNESS
G. V. Rasmussen
INVENTOR
MINOTT P. HUBBELL
BY
ATTORNEYS July 14, 1931.  M. P. HUBBELL  1,814,699
LATHE CHUCK
Filed May 8, 1928  3 Sheets-Sheet 3
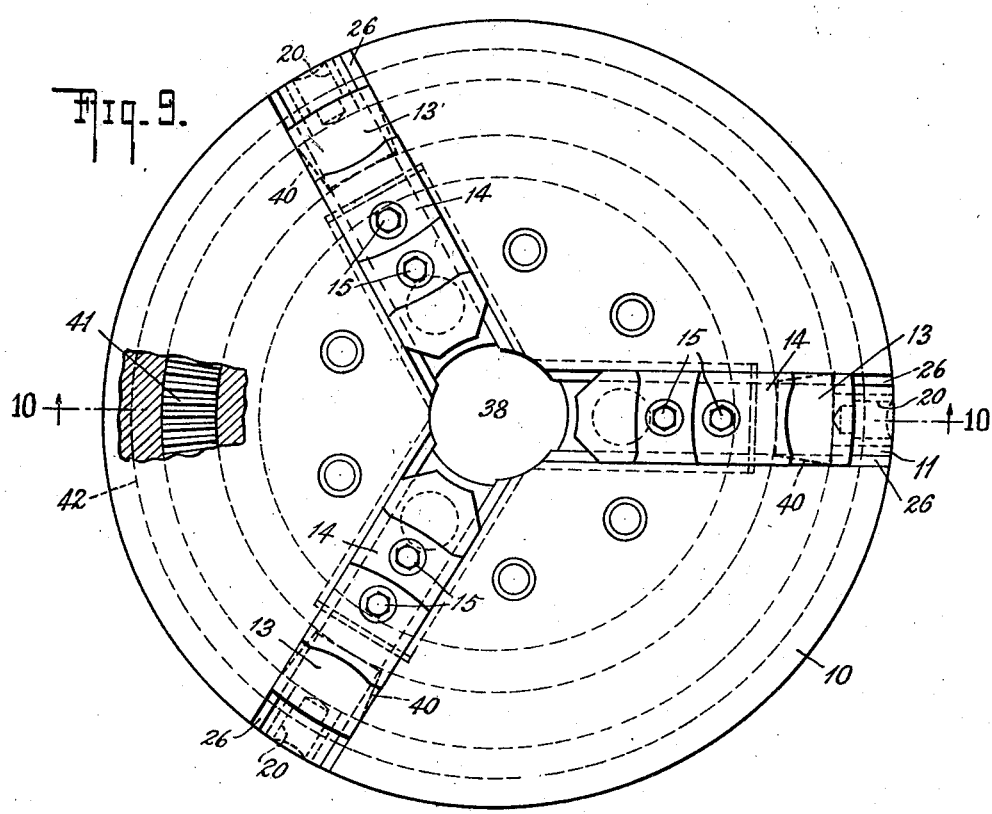
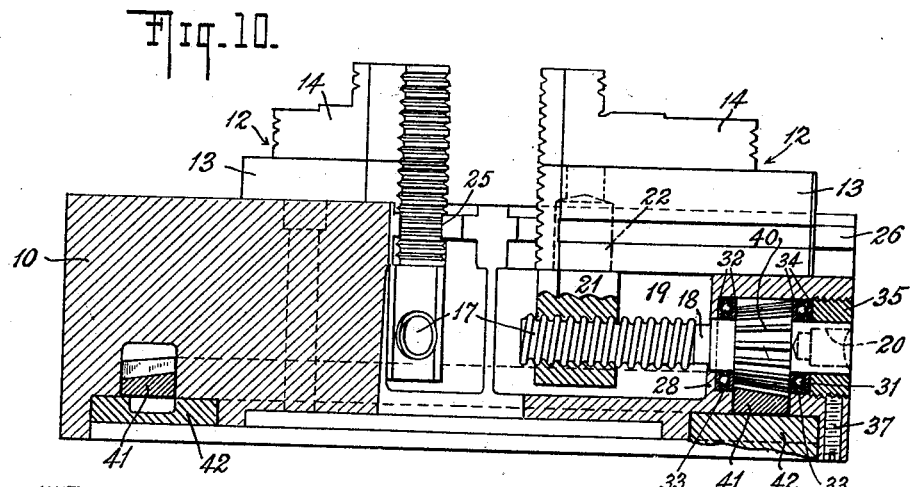
WITNESS
G. V. Rasmussen
INVENTOR
MINOTT P. HUBBELL
BY
ATTORNEYS Patented July 14, 1931

1,814,699

UNITED STATES PATENT OFFICE

MINOTT P. HUBBELL, OF ASHBURNHAM, MASSACHUSETTS

LATHE CHUCK

Application filed May 8, 1928. Serial No. 276,059.

This invention relates to lathe chucks of both the independent and the universal type wherein the jaws are moved either independently or in unison toward and away from the center of the chuck by means of screws, and relates more particularly to an improved thrust bearing for said screws and to a novel construction of driving nut for said jaws, the objects and advantages of which will appear more fully hereinafter.

In the drawings which illustrate by way of example a form of my invention without defining its limits, Fig. 1 shows a plan view of a chuck of the independent type with the jaws in position thereon; Fig. 2 is an elevational view with parts in section showing my improved thrust bearing and separate driving nut; Fig. 3 is a side elevation of a jaw member; Fig. 4 is a front view thereof; Fig. 5 shows the screw and driving nut thereon with the anti-friction elements assembled at one end thereof; Figs. 6 and 7 are end views of the same; Fig. 8 is a detail of the anti-friction ball bearing element; Fig. 9 is a modification showing my invention applied to a chuck of the universal type; and Fig. 10 is a section taken along the line 10—10 of Fig. 9.

Referring to the drawings, 10 indicates a chuck body having a plurality of radial guideways or grooves 11, preferably four in number, within which are slidably mounted work-piece engaging jaws 12. Each jaw 12 may be composed of a body 13 and an upper section 14 fastened to said body by means of screws 15 or the like received in tapped recesses 16 in the jaw body. As shown in the drawings, the upper section 14 may be offset toward the outer circumference of the chuck with respect to the jaw body through the provision of an extra tapped hole 16' in the jaw body, and may also be reversed in position upon said jaw body.

The jaws of this type of chuck are adapted to be moved independently toward and away from the center hole of the chuck by means of screws 17, formed on shafts 18 and operating in space 19 (through intermediate elements presently to be described), the screws being provided at their external ends with polygonal openings 20 which are adapted to be engaged by a wrench or other tool to rotate the screws manually.

I provide a novel arrangement of elements for effecting the longitudinal movement of the jaws and guiding the same in a manner free from binding upon rotation of the screws in either clockwise or counter-clockwise direction. In my preferred construction, the intermediate elements for transmitting the motion of the screws to the jaws comprise driving nuts 21 separate and distinct from the jaws 12 and engaging the screws 17. The nuts 21 are adapted to be connected to the jaws 12, and to this end each nut is provided with a stud 22 fitting into a recess 23 in the jaw body 13. The fit of this stud in the opening may be either a so-called "running" fit or a tight press fit. If a running fit is employed the nut may be inserted into the recess 23 by hand. If, however, a tight press fit is desired, the nut may be forced in under an arbor press or hammered in, and in order to facilitate disassembly of the nut from the jaw the recess 23 is made to extend completely through the jaw body 13, as shown at 24, so that the nut may be forced out of the same by a punch or other tool upon removal of the upper section 14 of the jaw. Because of the fact that the nut is separate and removable from the jaw body, each may be made of material best suited to its intended function; for example, the nut may be made of more wear-resisting material than said body without materially increasing the total cost.

Extending longitudinally at each side of each jaw and along the whole length of the same is a spline or groove 25, each arranged to engage a feather 26 extending into the guideway 11. The splines and feathers cooperate to provide efficient guiding means for the jaws which are free from binding action, and because of the large bearing surface, are subject to very little wear.

It will be apparent that as the jaws move longitudinally along the screws, a thrust will be transmitted to the screws, particularly when the jaws are forced against a work-piece, and that as the thrust increases upon engagement of the work-piece, by the jaws, it becomes increasingly difficult to rotate the screws in order to advance the jaws still further to grip the work more securely. In the types of thrust bearings now commonly employed, surfaces of limited area are made to engage each other directly, with the result that friction rapidly wears the parts away and makes frequent repair and replacement necessary.

These disadvantages are entirely overcome by my improved construction wherein an anti-friction bearing is employed to take up the thrust on the screw, the said bearing being so constructed and located as to permit the use of lubricating means for further reducing the friction on the parts and the easy disassembly of the same for repair and replacement.

In the preferred embodiment illustrated, anti-friction ball bearing means in the form of a double thrust bearing are provided for transmitting the thrust from each screw to a part of the chuck body. This anti-friction thrust bearing, as shown in Fig. 2, is housed within a radial recess 27 extending into the body of the chuck in radial alignment with the space 19. The recess 27 is reduced in diameter as shown at 27ª, a shoulder 28 being thereby formed at a point spaced from the outer periphery of the chuck. A ring member or flange 29 is secured to the screw shaft 18 near one end thereof and in the construction illustrated is shown located a short distance from the outer end and is preferably formed integral with said shaft. Interposed between the inner face of said flange and said shoulder 28 is an annular retaining member 30, preferably made of bronze, in which are seated a number of ball bearings 31. Hardened steel raceways which may be in the form of washers 32 are located between said ball bearings and the inner face of the flange on the screw shaft and the shoulder in the casing and serve to take up the wear. A similar retaining member 33 is positioned to the right of the flange 29 and separated therefrom by the washer 34. A similar washer 34 is positioned at the right of the last mentioned retaining member and the whole bearing is closed by means of a nut 35 fitting over shaft 18 and externally threaded to engage a tapped section 36 on the interior of the casing. The nut 35 is held in adjusted position by means of a set screw 37. Grease or other lubricating material may be forced into the bearing prior to the tightening of the nut 35, and if desired felt or other fabric washers may be employed to make the bearing grease-proof.

It will be seen from the construction described that the thrust upon the screw both toward and away from the center of the chuck will be transmitted by the flange 29 either to the shoulder 28 or to the face of the nut 35. By the use of my bearing, therefore, not only is friction greatly reduced, but the thrust is transmitted to a comparatively large bearing surface and hence the wear on the parts is still further reduced. When necessary the washers 32 and 34 can be easily removed and replaced with new ones with little labor and expense. The bearing is readily accessible and can be easily assembled or disassembled. Because of the greatly reduced friction in rotating the screw 17 it has been found in actual practice that the gripping power of the jaws 12 has been increased by as much as 100%.

The chuck body 10 is attached to the usual bottom plate 39, and is provided with an aperture 38 for a purpose to be immediately described.

The method of assembling the nut in the jaw is as follows: The body of the chuck having been separated from the bottom plate 39, the jaw body 13 is pushed into and along the feathered guideways of the chuck body until the recess 23 registers with the center hole 38 of the chuck, and the nut 21 is then inserted into the center hole from the bottom and the stud 22 fitted into the recess 23. The jaw and nut are then moved radially outwardly until the nut engages the screw 17, which has been assembled with its bearing in casing 27 in a manner that will be clear from the drawings, and upon rotation of the screw the nut will ride thereon. The plate 39 is then bolted in place as shown in Fig. 2.

In the modification shown in Figs. 9 and 10, I have shown my invention embodied in a universal type of chuck, which, as shown, may have only three jaws 12. The construction of the driving nut and screw and anti-friction bearing for the screws in this type of chuck is, in general, similar to that of the independent chuck shown in Figs. 1 to 8 and need not be again described in detail. Means are, however, provided for effecting movement of all of the jaws in unison upon rotation of the screw associated with any one of the jaws. A bevel gear 40 is mounted upon the screw shaft 18 and, preferably, is positioned in the same manner as and takes the place of the flange or collar 29 and like the latter bears against the washers 32 and 34. The gears 40 are adapted to mesh with an annular rack 41 which is slidable upon a stationary bearing plate 42. It will be clear that upon manual rotation of any one of the screws 17, the rack 41 will be rotated and will in turn revolve the gears on the other screw shafts, so that all of the gears will be moved in unison. As in the case of the independent type of chuck described above, the thrust along the screws will be transmitted through the anti-friction gearing either to the shoulder 28 or to the inner face of the nut 35.

Variations may be resorted to within the scope of the appended claims without departing from the spirit of the invention.

I claim:

1. In a lathe chuck, the combination of a chuck body having a guideway, a work-piece engaging jaw positioned in said guideway for movement longitudinally thereof, guiding elements on said jaw extending the whole length thereof, cooperating guiding elements in said guideway extending the whole length thereof for maintaining guiding contact between the jaw and guideway throughout their overlapping lengths to prevent upward or downward displacement of said jaw, a screw rotatably mounted in said chuck body, a driving nut separate from said jaw and mounted on said screw for longitudinal movement therealong, the inner end of said screw being unsupported except for said nut, said body having a recess at its center of greater diameter than said nut, whereby the latter may be inserted through said recess and threaded onto said screw, and a connection between the nut and the jaw, whereby movement of said nut is transmitted to said jaw.

2. In a lathe chuck, the combination of a chuck body having a guideway, a work-piece engaging jaw positioned in said guideway for movement longitudinally thereof, guiding elements on said jaw extending the whole length thereof, cooperating guiding elements in said guideway extending the whole length thereof for maintaining guiding contact between the jaw and guideway throughout their overlapping lengths to prevent upward or downward displacement of said jaw, a screw rotatably mounted at its outer end in said chuck body, the chuck body having a radial bore extending to the outer periphery thereof, the outer portion of said bore being enlarged to provide a shoulder, a double thrust bearing for the outer end of said screw comprising an annular flange on said screw spaced from the outer end of the latter, anti-friction elements between said flange and said shoulder, additional anti-friction elements on the other side of said flange and a closure member for sealing said bore and enclosing said anti-friction elements, a driving nut separate from said jaw and mounted on said screw for longitudinal movement therealong, the inner end of said screw being unsupported except for said nut, said body having a recess at its center of greater diameter than said nut, whereby the latter may be inserted through said recess and threaded onto said screw, and a connection between the nut and the jaw, whereby movement of said nut is transmitted to said jaw.

MINOTT P. HUBBELL.